(12) United States Patent
Oozawa

(10) Patent No.: US 7,876,226 B2
(45) Date of Patent: Jan. 25, 2011

(54) METHOD OF PREVENTING FAILURE OF READING WIRELESS TAGS, AND WIRELESS TAG DATA MANAGEMENT SYSTEM

(75) Inventor: Shuji Oozawa, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 328 days.

(21) Appl. No.: 12/043,341

(22) Filed: Mar. 6, 2008

(65) Prior Publication Data

US 2009/0002169 A1 Jan. 1, 2009

(30) Foreign Application Priority Data

Jun. 29, 2007 (JP) ............... 2007-172667

(51) Int. Cl.
*G08B 13/14* (2006.01)
(52) U.S. Cl. ............... 340/572.4; 340/572.1; 340/10.1
(58) Field of Classification Search ............... 340/505
See application file for complete search history.

(56) References Cited

U.S. PATENT DOCUMENTS 7,307,533 B2 * 12/2007 Ishii ............... 340/572.1

2006/0044113 A1 * 3/2006 Hashimoto et al. ......... 340/10.1
2006/0145817 A1 * 7/2006 Aikawa et al. ............. 340/10.3
2006/0181420 A1 * 8/2006 Ishii ....................... 340/572.1
2006/0267731 A1 * 11/2006 Chen ....................... 340/10.1
2007/0273516 A1 * 11/2007 Sayers et al. ............. 340/572.1

FOREIGN PATENT DOCUMENTS

JP 2006-209761 8/2006

* cited by examiner

*Primary Examiner*—Travis R Hunnings
(74) *Attorney, Agent, or Firm*—Turocy & Watson, LLP

(57) ABSTRACT

A method includes a step of dividing tag IDs of plural wireless tags into groups; a step of sequentially storing tag data items in storage areas provided for the wireless tags, each tag data item including a tag ID and related-tag data constituted by the tag IDs of other wireless tags belonging to the same group as the wireless tag; a step of reading the stored tag data items; a step of generating a list of read tag IDs and a list of related tag IDs, from the tag IDs included in the tag data items read in the tag-data reading step and the related-tag data, and then determining whether the read tags coincide with the related tags; and a step of outputting reading-error data when tag IDs are determined to exist in the list of related tag IDs but not in the list of read tag IDs.

10 Claims, 5 Drawing Sheets

METHOD OF PREVENTING FAILURE OF READING WIRELESS TAGS, AND WIRELESS TAG DATA MANAGEMENT SYSTEM

CROSS-REFERENCE TO RELATED APPLICATIONS

This application is based upon and claims the benefit of priority from the prior Japanese Patent Application No. 2007-172667, filed on Jun. 29, 2007, the entire contents of which are incorporated herein by reference.

BACKGROUND OF THE INVENTION

1. Field of the Invention

The present invention relates to a method of preventing failure of reading wireless tags, and a wireless tag data management system.

2. Description of the Related Art

Radio frequency identification (RFID) systems are well known as technology that identifies data about products during manufacture and commercial transactions. Most RFID systems include wireless tags, a wireless tag reader/writer, and a host computer. Each wireless tag has a tiny wireless chip (integrated circuit). The wireless tag reader/writer can receive electric waves transmitted from any wireless tag, in non-contact fashion, to acquire the tag data containing the tag ID. The host computer obtains the tag data from the wireless tag reader/writer and processes the tag data. Thus, the tag data, which is data about the product to which the wireless tag is attached, can be read by using the wireless tag reader/writer in non-contact fashion. The tag data can be sent via the driver incorporated in the host computer and be utilized in various applications. This is why the RFID system is used in various business fields.

However, the wireless tag is detected only by reading the data from it. Hence, if the wireless tag reader/writer fails to read the tag data, whether the product has no wireless tags or the tag data cannot be read from the wireless tag cannot be determined at all.

In order to prevent such failure of reading the tag data, a technique has been developed (see, for example, Jpn. Pat. Appln. Laid-Open Publication No. 2006-209761). This technique resides in attaching a wireless tag (parent tag) to the product, in addition to the wireless tag (child tag) identifying the product. The parent tag is used for group management of products. That is, the parent tag holds the group ID of the product, making it possible to identify the group to which the product belongs.

However, the technique described above is disadvantageous because the parent tag must be used to achieve group management of products in addition to the child tag. Further, both the parent tag and the child tag must hold data that represents the parent-child relationship. In view of this, the parent tag can hardly be attached to the product in practice.

BRIEF SUMMARY OF THE INVENTION

According to embodiments of the present invention, an object of the present invention is to provide a method of preventing failure of reading wireless tags and a wireless tag data management system, in which wireless tags can be easily attached to products and other tags need not be attached to the products to achieve the group management of products.

The present invention may provide a method of preventing failure of reading wireless tags, which comprises: a grouping step of dividing tag IDs of a plurality of wireless tags into groups; a tag-data storing step of sequentially storing tag data items in storage areas provided for the wireless tags, respectively, each tag data item including a tag ID and related-tag data constituted by the tag IDs of other wireless tags belonging to the same group as the wireless tag; a tag-data reading step of reading the tag data items stored in the tag-data storing step, by using the wireless tag reader/writer; a determining step of generating a list of read tag IDs and a list of related tag IDs, from the tag IDs included in the tag data items read in the tag-data reading step and the related-tag data, and then determining whether the read tags coincide with the related tags; and a reading-error outputting step of outputting reading-error data to a display unit of a host computer when tag IDs are determined to exist in the list of related tag IDs but not in the list of read tag IDs, in the determining step.

DETAILED DESCRIPTION OF THE INVENTION

Figure 1:
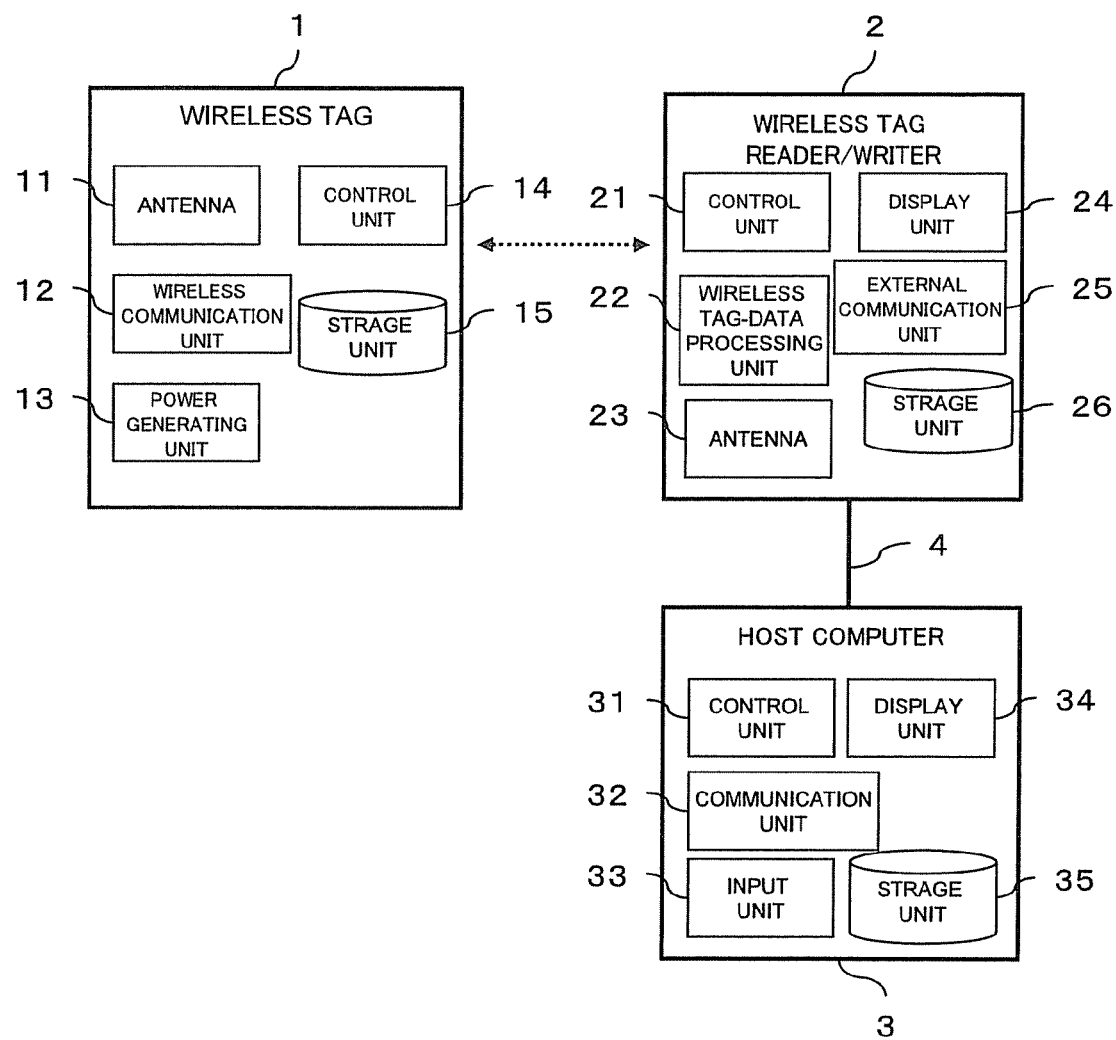
FIG. 1 is a diagram showing an overall configuration of a wireless tag data management system according to an embodiment of the present invention.

An embodiment of the present invention will be described with reference to the accompanying drawings. FIG. 1 is a diagram showing an overall configuration of the embodiment of this invention.

The embodiment, or a wireless tag data management system, includes a wireless tag 1, a wireless tag reader/writer 2, and a host computer 3. The wireless tag reader/writer 2 is connected by an USB cable 4 to the host computer 3.

The wireless tag 1 includes an antenna 11, a wireless communication unit 12, a power generating unit 13, a control unit 14, and a storage unit 15. In the wireless tag 1, the antenna 11 receives a electric wave (hereinafter referred to as "response-requesting wave") transmitted from the wireless tag reader/writer 2 and requesting for a response. From the response-requesting wave, the power generating unit 13 generates drive power to the drive some other components of the wireless tag 1. The storage unit 15 has a storage region, which consists of a user-data area and a security area. The user can update the user data stored in the user-data area. In the security area, no data can be written unless a password or the like is input. For example, the attribute data items of a product or a baggage are stored in the user-data area, while the tag IC or the like is stored, as tag data, in the security area. The wireless communication unit 12 supplies a electric wave to the antenna 11. This electric wave (hereinafter referred to as "response wave") has been modulated with the tag data stored in the storage unit 15. The antenna 11 transmits the response wave to the wireless tag reader/writer 2.

The wireless tag reader/writer 2 includes a control unit 21, a wireless tag-data processing unit 22, an antenna 23, a display unit 24, an external communication unit 25, and a storage unit 26. The control unit 21 is a central processing unit. The wireless tag-data processing unit 22 reads and writes wireless tag data. The antenna 23 transmits and receives waves to and from the wireless tag 1. The display unit 24 can display the operating state of the wireless tag reader/writer 2 and some other data. The external communication unit 25 performs communication with the host computer 3. The storage unit 26 stores various programs.

Under the control of the wireless tag-data processing unit 22, the antenna 23 transmits and receives, to and from the wireless tag 1, a electric wave of a preset frequency, which propagates in a communication region. More specifically, the antenna 23 generates a response-requesting wave from the data or instruction signal transmitted from the wireless tag-data processing unit 22, and transmits the response-requesting wave toward the wireless tag 1. The wireless tag-data processing unit 22 receives, via the antenna 23, the response wave coming from the wireless tag 1.

The host computer 3 controls the entire wireless tag data management system. The host computer 3 includes a control unit 31, a communication unit 32, an input unit 33, a display unit 34, and a storage unit 35. The control unit 31 is a central processing unit. The communication unit 32 performs communication with the external communication unit 25 of the wireless tag reader/writer 2. The input unit 33 is, for example, a keyboard. The display unit 34 is, for example, a monitor. The storage unit 35 stores various applications and software such as a driver for a hardware device as well as the tag data the wireless tag reader/writer 2 has read, so that the tag data may be managed. When the communication unit 32 receives the tag data from the wireless tag reader/writer 2, the control unit 31 reads a tag-data discriminating program from the storage unit 35 and stores this program into a memory (not shown). Then, the communication unit 31 analyzes the tag data on the basis of a predetermined relation with the wireless tag 1 and determines whether the wireless tag reader/writer has failed to read the tag data. The data representing the decision the communication unit 31 has made is supplied to the display unit 34. The display unit 34 displays the decision.

Figures 2, 3:
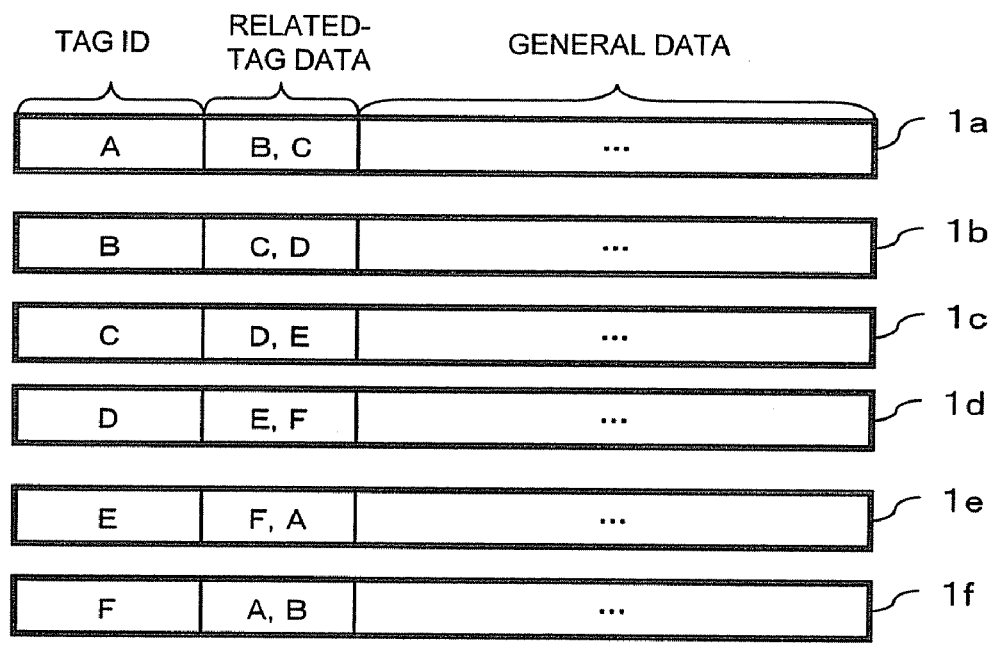
FIG. 2 is a table showing an example of classification of wireless tags, which is applied to the embodiment of the present invention.
FIG. 3 is a diagram illustrating a specific example of data stored in a wireless tag in the embodiment of this invention.

The contents of the tag data stored in the wireless tag 1 will be described with reference to FIG. 2 and FIG. 3. FIG. 2 is a table showing a specific example of a relation between the group IDs, each representing the classification of a wireless tag, and the wireless tag data items. As seen from FIG. 2, any wireless tag used in the system is classified as one that belongs to one of the groups. For example, the wireless tag having tag ID "A" is classified as one belonging to "Group_1." This group classification is defined beforehand, based on the manners in which the subjects having wireless tags 1 should be handled and managed. To manage important documents, e.g., insurance policies and contracts, which are related to one another and should be filed in a specific order, wireless tags are attached to them and defined as belonging to one group. The data representing this group definition is stored in the storage unit 35 of the host computer 3. The group definition is made by the manager in charge of, for example, merchandise items to which wireless tags are attached. The group-definition data can be updated, whenever necessary.

FIG. 3 is a diagram illustrating a specific example of the tag data stored in the wireless tag 1. As FIG. 3 shows, the tag data consists of a tag ID, related-tag data, and general data (e.g., name of the merchandise item, merchandise code, and sales data). The tag data is the data the wireless tag reader/writer 2 has written into the wireless tag 1 in accordance with an instruction from the host computer 3. The "related-tag data" is composed of the tag IDs of the other wireless tags 1 of the same group. In most cases, the related-tag data shows the other subjects that exist near the subject and should be managed together with the subject. The related-tag data has been generated in accordance with the group classification shown in FIG. 2. For example, the wireless tags 1 having tag IDs "A" to "F," which are shown in FIG. 3 belong to "Group_1." Therefore, two tag IDs are extracted from those pertaining to "Group 1" and stored, separated from each other with a comma. The related-tag data for each wireless tag is so stored that a part of it overlaps the related-tag data for any other wireless tag of the same group. The number of the tag IDs that are stored as related-tag data is not limited to two. For instance, three tag IDs, tag IDs of all other wireless tags or all tag IDs pertaining to the same group may be stored as related-tag data. Nonetheless, the set of related-tag data items about the same group must contain the IDs of all wireless tags that constitute the group.

Figure 4:
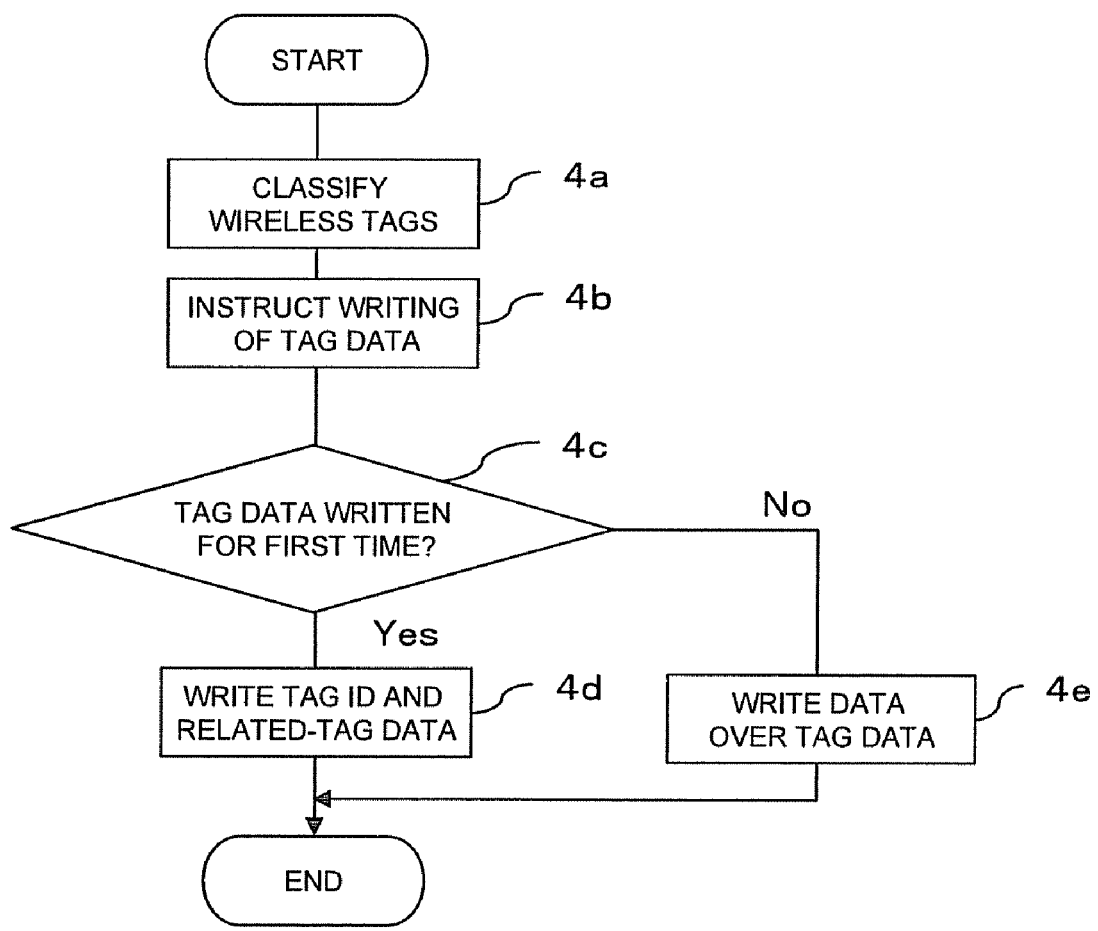
FIG. 4 is a flowchart explaining how wireless tag data is written in the embodiment of the present invention.
Figure 5:
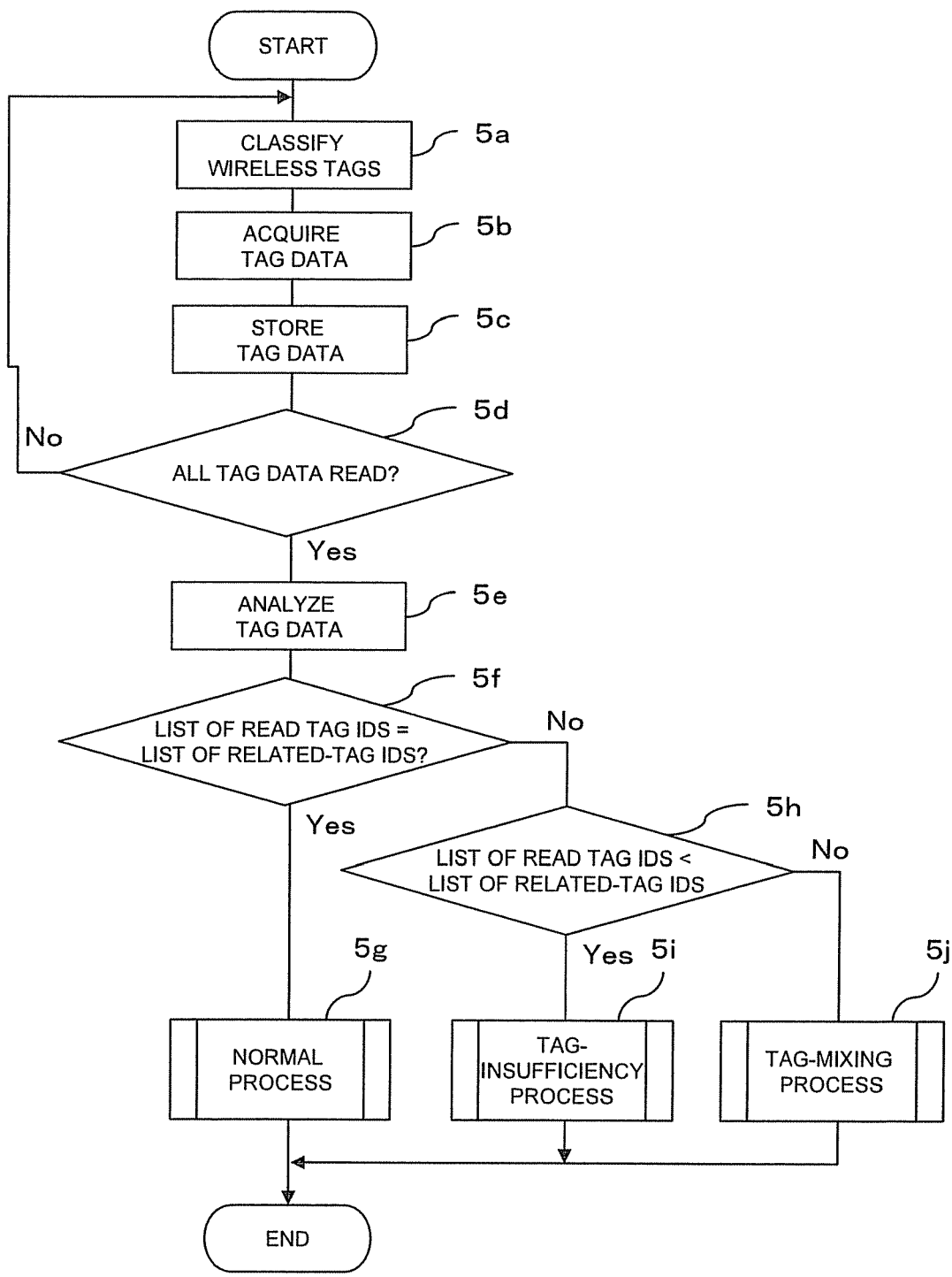
FIG. 5 is a flowchart explaining how wireless tag data is read in the embodiment of the present invention.
Figure 6:
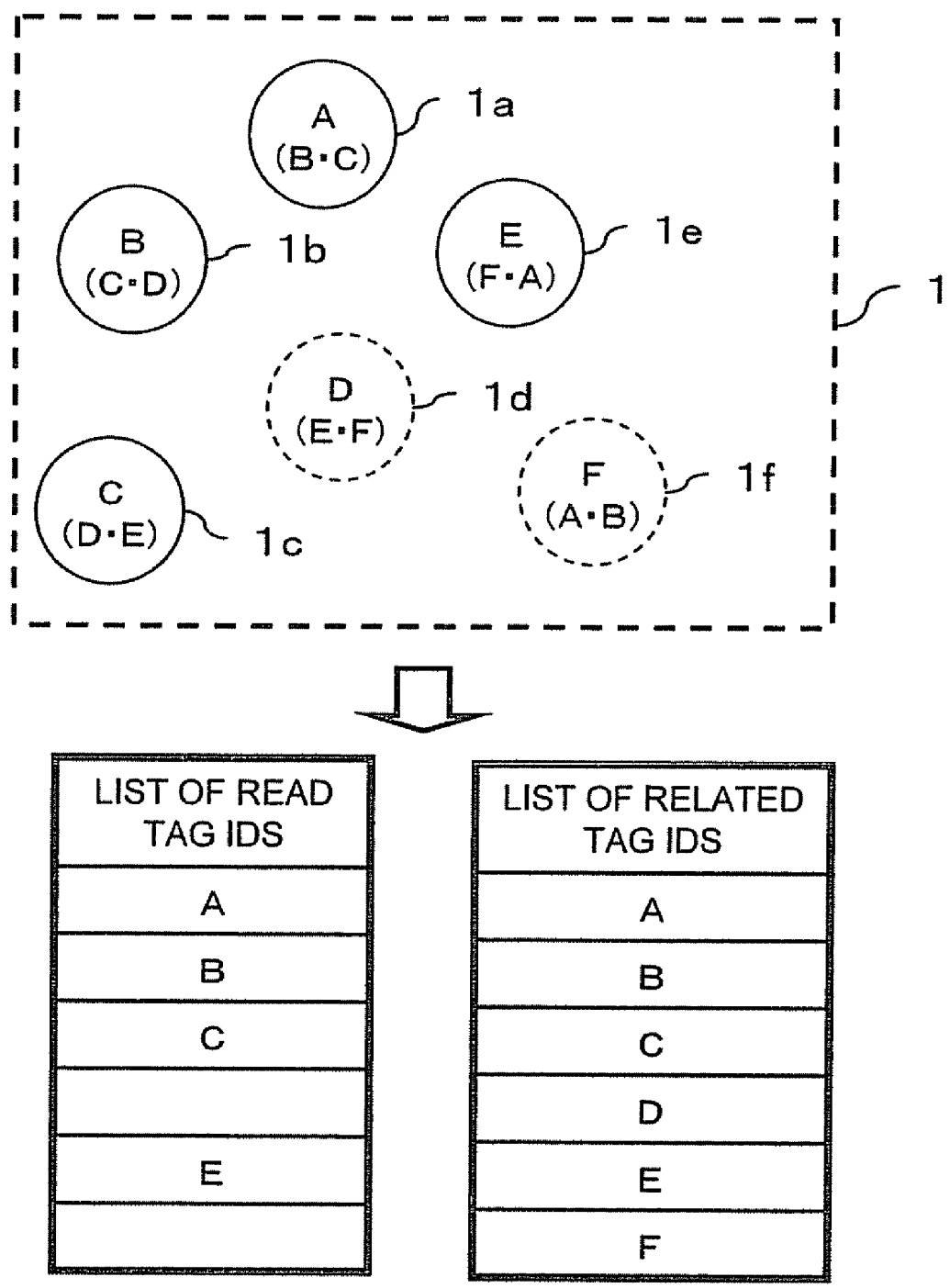
FIG. 6 is a diagram explaining how a wireless tag data reading error may develop in the embodiment of the present invention.

How the wireless tag data management system according to the embodiment operates will be explained with reference to FIG. 4 to FIG. 6. FIG. 4 is a flowchart that explains a specific process of storing tag data in the wireless tag 1.

First, the host computer 3 classifies a plurality of wireless tags 1 attached to the subjects that should be managed as a group, in accordance with the data input to the input unit 33 (Step 4a). The data representing the resulting group classification is stored in the storage unit 35.

Next, the host computer 3 generates a write command, which is supplied via the communication unit 32 to the wireless tag reader/writer 2, instructing the wireless tag reader/writer 2 to write tag data into the wireless tags 1 (Step 4b).

In the wireless tag reader/writer 2, the wireless tag-data processing unit 22 determines whether data is to be written into the wireless tags 1 for the first time, from the data supplied from the host computer 3 (Step 4c).

If it is determined that data will be written for the first time, the wireless tag-data processing unit 22 of the wireless tag reader/writer 2 performs communication with the wireless tags 1, via the antenna 23. The tag IDs the host computer 3 has designated, the related-tag data and the general data are written, as tag data, in the order mentioned into the user-data area of each wireless tag 1 (Step 4d). Then, the process of storing tag data is terminated.

In Step 4c, it may not be determined that data will be written for the first time. In this case, the wireless tag-data processing unit 22 of the wireless tag reader/writer 2 performs communication with the wireless tags 1, writing the related-tag data and the general data over the tag data held in the wireless tags 1 identified with the tag IDs designated by the host computer 3 (Step 4e). Then, the process of storing tag data is terminated.

A process of reading the tag data from the wireless tags 1 (tags 1a to 1f), which hold such tag data items as shown in FIG. 3, will be explained with reference to FIG. 5. FIG. 5 is a flowchart explaining a specific process of reading wireless tag data from the wireless tags.

First, the wireless tag reader/writer 2 transmits a response-requesting wave to the wireless tags 1. In response to this wave, each wireless tag 1 transmits a response wave. On receiving the response waves from the wireless tags 1, the wireless tag reader/writer 2 detects the wireless tags 1 (Step 5a).

Next, the wireless tag reader/writer 2 acquires the tag data generated by demodulating the response wave in the wireless tag-data processing unit 22. The external communication unit 25 of the wireless tag reader/writer 2 transmits this tag data to the host computer 3 (Step 5b).

In the host computer 3, the communication unit 32 receives the tag data. The tag data is stored in the storage unit 35 (Step 5c).

Then, the host computer 3 determines whether all wireless tags 1 that are the subject of reading have been read or not (Step 5d).

If all wireless tags 1 have been read, the process goes to Step 5e.

If all wireless tags 1 have not been read, the process returns to Step 5a. Then, Steps 5a to 5d are repeated until all the subjected wireless tags are read.

In Step 5e, the host computer 3 complies and analyzes the tag IDs and related-tag data items, which are contained in the tag data items, read from the respective wireless tags 1. In other words, the host computer 3 generates a list of the tag IDs that have been read from the wireless tags 1 (hereinafter, referred to "list of read tag IDs") and a list of the tag IDs of related wireless tags (hereinafter, referred to as "list of related tag IDs") Further, the host computer 3 compares the list of read tag IDs with the related tag IDs. Note that the list of related tag IDs is generated in accordance with whether the related tag data items overlap one another. That is, any wireless tag holding data not overlapping the data held in any other wireless tag is not regarded as a related tag.

Next, it is determined whether the list of read tag IDs is identical to the list of the related tag IDs (Step 5f).

If the list of read tag IDs is identical to the list of the related tag IDs, all wireless tags are determined to have been read. In this case, data indicating that all wireless tags have been read is output to the display unit 34. Then, the process of reading wireless tag data is terminated (Step 5g).

In Step 5f, the list of read tag IDs may not be found to be identical to the list of related tag IDs. If this is the case, the process goes to Step 5h.

In Step 5h, the host computer 3 compares the list of read tag IDs with the list of related tag IDs, determining whether the read wireless tags exist in smaller numbers than the related wireless tags.

Assume here that tag IDs exist in the list of related tag IDs, though not in the list of read tag IDs. Then, reading-error data is output to the display unit 34. The process is then terminated (Step 5i). FIG. 6 is a diagram explaining how a reading error may develop in the embodiment of the present invention. In this instance, the tag-data reading from the wireless tags having tag IDs "D" and "F" has failed. Since these wireless tags are listed in the list of related tag IDs, which has been prepared from the tag data items successfully read, a wireless tag reading error is detected.

On the other hand, tag IDs may exist in the list of read tag IDs, though not in the list of related tag IDs. In this case, wireless tag mixing data is output to the display unit 34 and the process is then terminated (Step 5j).

The related-tag data is thus stored in each wireless tag 1. Hence, tag-data reading errors and the mixing of unrelated wireless tags can be easily detected without using a wireless tag (parent tag) for tag-group management.

The present invention is not limited to the various embodiments described above. The components of any embodiment can be modified in various manners in reducing the invention to practice, without departing from the sprit or scope of the invention. Further, the components of the embodiments described above may be combined, if necessary, in appropriate ways, thereby to make different inventions. For example, some of the components of any embodiment may not be used. More specifically, the tag data may include the group ID identifying the group to which the tag belongs or the total number of the wireless tags of the same group, so that the relation between the tag IDs read and the presence or absence of reading errors may be determined. Moreover, the tag data may be written in the security area, not in the user-data area as described above.

What is claimed is:

1. A method of preventing failure of reading wireless tags, for use in a wireless tag data management system comprising a wireless tag reader/writer for reading and writing tag data items from and in wireless tags by performing radio communication with the wireless tags, and a host computer connected to the wireless tag reader/writer, the method comprising:

a grouping step of dividing tag IDs of the plurality of wireless tags into groups;

a tag-data storing step of sequentially storing tag data items in storage areas provided for the wireless tags, respectively, each tag data item including a tag ID and related-tag data constituted by the tag IDs of other wireless tags belonging to the same group as the wireless tag;

a tag-data reading step of reading the tag data items stored in the tag-data storing step, by using the wireless tag reader/writer;

a first determining step of generating a list of read tag IDs and a list of related tag IDs, from the tag IDs included in the tag data items read in the tag-data reading step and the related-tag data, and then determining whether the read tags coincide with the related tags;

a second determining step of comparing the list of read tag IDs with the list of related tag IDs, determining whether the read wireless tags exist in smaller numbers than the related wireless tags in case the list of read tag IDs is not identical to the list of related tag IDs, in the first determining step; and a reading-error outputting step of outputting reading-error data of the shortage of the wireless tags to a display unit of a host computer when tag IDs are determined to exist in the list of related tag IDs but not in the list of read tag IDs and outputting wireless tag mixing data to a display unit of a host computer when tag IDs may exist in the list of read tag IDs, though not in the list of related tag IDs, in the second determining step.

2. The method of preventing failure of reading wireless tags, according to claim 1, wherein in the tag-data storing step, the related-tag data is stored, including the tag IDs of at least two other wireless tags, overlapping, partly or entirely, the related-tag data about any other wireless tag, and a set of the related-tag data items is stored, including the tag IDs of all wireless tags belonging to the same group.

3. The method of preventing failure of reading wireless tags, according to claim 1, wherein each of the tag-data items contains a group ID identifying the group.

4. The method of preventing failure of reading wireless tags, according to claim 1, wherein each of the tag-data items contains a total number of the wireless tags belonging to the same group.

5. A wireless tag data management system comprising:

wireless tags, each of which has at least a user-data area in which a user is able to write data, a tag ID inherent to the wireless tag and related-tag data constituted by the tag IDs of other wireless tags defined as belonging to the same group are stored;

a wireless tag reader/writer configured to read and write tag data items from and in the wireless tags by performing radio communication with the wireless tags;

a determining unit connected to the wireless tag reader/writer and configured to analyze the tag data items read by the wireless tag reader/writer, thereby determining whether the wireless tag reader/writer has failed to read any wireless tag or the wireless tag reader/writer has read mixed wireless tags; and a display unit configured to display a reading error when the determining unit determines that the wireless tag reader/writer has failed to read any wireless tag and to display a mixing error when the determining unit determines that the wireless tag reader/writer has read mixed wireless tag.

6. The wireless tag data management system according to claim 5, wherein all wireless tags are classified into a plurality of groups, and the related-tag data is set in accordance with the group classification.

7. The wireless tag data management system according to claim 5, wherein the related-tag data represents wireless tags that are located near a specific wireless tag and should be managed as belonging to the same group as the specific wireless tag.

8. The wireless tag data management system according to claim 5, wherein the related-tag data is stored, with a part overlapping the related-tag data pertaining to the other wireless tags.

9. The wireless tag data management system according to claim 5, wherein the tag IDs of the other wireless tags are stored as the related-tag data.

10. The wireless tag data management system according to claim 5, wherein a set of related-tag data items of all wireless tags belonging to the same group includes a tag ID identifying the group.

* * * * *